United States Patent
Endoh

Patent Number: 5,557,671
Date of Patent: Sep. 17, 1996

[54] DIALING APPARATUS

[75] Inventor: Shozo Endoh, Kawasaki, Japan

[73] Assignee: Canon Kabushiki Kaisha, Tokyo, Japan

[21] Appl. No.: 174,774

[22] Filed: Dec. 29, 1993

[30] Foreign Application Priority Data

Jan. 7, 1993 [JP] Japan .................. 5-016952

[51] Int. Cl.⁶ .................. H03M 11/10
[52] U.S. Cl. .................. 379/355; 379/368; 379/356; 379/52
[58] Field of Search .................. 379/355, 368, 379/356, 52

[56] References Cited

U.S. PATENT DOCUMENTS

| | | | |
|---|---|---|---|
| 4,947,423 | 8/1990 | Watanabe | 379/353 |
| 5,140,632 | 8/1992 | Anten | 379/447 |
| 5,311,175 | 5/1994 | Waldman | 341/34 |

FOREIGN PATENT DOCUMENTS

| | | | |
|---|---|---|---|
| 0015556 | 1/1982 | Japan | 379/354 |
| 2124854 | 2/1984 | United Kingdom | 379/88 |

Primary Examiner—Krista M. Zele
Assistant Examiner—Gloria Tebcherani
Attorney, Agent, or Firm—Morgan & Finnegan, L.L.P.

[57] ABSTRACT

A dialing apparatus for transmitting a dial signal to a communication line comprises a numerical input key, a generator for generating an audible sound according to the depression of the numerical input key, a transmitter for transmitting a dial signal according to the depression of the numerical input key to the communication line at an independent timing from the generation of the audible sound, a memory to store the data according to the numerical value of the depressed key, an instruction key to instruct the transmitter to transmit the dial signal according to the data stored in the memory, and a second instruction key to instruct the generator to generate the audible sound according to the data stored in the memory. A double stage type switch may be used as a numerical input key. When the switch at the first stage of the double stage type numerical input key is turned on, the audible sound according to the numerical key is generated. When the switch at the second stage is turned on, the dial signal according to the numerical key is transmitted to the line.

23 Claims, 7 Drawing Sheets

DIALING APPARATUS

BACKGROUND OF THE INVENTION

1. Field of the Invention

The invention relates to a dialing apparatus having a function to inform an input dial number to the operator.

2. Related Background Art

In a conventional communication apparatus terminal apparatus such as a telephone or the like, in case of inputting a telephone number by a ten-key a person who has a normal eyesight ordinarily confirms the ten-key by his own eyes or confirms the input number displayed in a liquid crystal display section by the eyes, thereby preventing an erroneous input of the telephone number.

However, since a visually handicapped person cannot confirm the ten-key by the eyes, it is necessary to confirm a numerical input key by a method of appealing to a sense other than the eyesight. Hitherto, as a ten-key which considers the use of the visually handicapped person, there has been known a method whereby a concave/convex portion is formed in a key top portion of a key of "5" or the like, the key with the concave/convex portion serving as a reference position is searched by a tactile sensation, the key locating at the reference position is used as a reference, and a key of another number is searched. There is also a method whereby numbers are carved and sealed by braille types in the lower portions of the ten-key or the positions near them or the like.

However, according to the method of forming a concave/convex portion on the key top portion, the relative positional relation with the position of the ten-key formed with the concave/convex portion is imaged in the brain and the position at which the key of a desired number exists is presumed on the basis of such an image, so that it takes a certain time until the visually handicapped person doesn't erroneously input the telephone number. On the other hand, even if the telephone number was erroneously input, he is not aware of such an erroneous inputting operation, so that there is a problem such that he frequently makes a mistake in telephone calling.

On the other hand, according to the method of carving and sealing the numbers by braille types in the lower portions of the ten-key or at the positions near them or the like, when the braille type is read by the finger, there is a high possibility such that the finger is unexpectedly come into contact with the key top of a key of a number other than a desired number. In this case, even when the finger touches the key top of the key of the number other than the desired number, the visually handicapped person isn't aware of a fact that the number other than the desired number has been inputted, so that he continues the inputting operation in such a state, so that there is a problem such that the telephone number is eventually erroneously input and he makes a wrong telephone call.

SUMMARY OF THE INVENTION

It is an object of the invention to prevent a wrong telephone call.

Another object of the invention is to inform the dial number to the operator by an audible sound before a dial signal is transmitted.

Still another object of the invention is to provide a dialing apparatus for transmitting a dial signal according to the depression of a numerical key at a timing different from the generating timing of an audible sound corresponding to the depression of the numerical key.

Further another object of the invention is to provide a dialing apparatus in which after an audible sound according to the depression of a numerical key was generated, a dial signal according to the depressed numerical key is transmitted to a communication line in accordance with whether the numerical key is depressed for a long time or not.

Further another object of the invention is to provide a dialing apparatus in which when a switch at the first stage of a numerical key is turned on, an audible sound according to the depressed numerical key is generated, and when a switch at the second stage of the numerical key is turned on, a dial signal according to the depressed numerical key is transmitted to a communication line.

The above and other objects and features of the present invention will become apparent from the following detailed description and the appended claims with reference to the accompanying drawings.

DETAILED DESCRIPTION OF THE PREFERRED EMBODIMENTS

Figure 1:
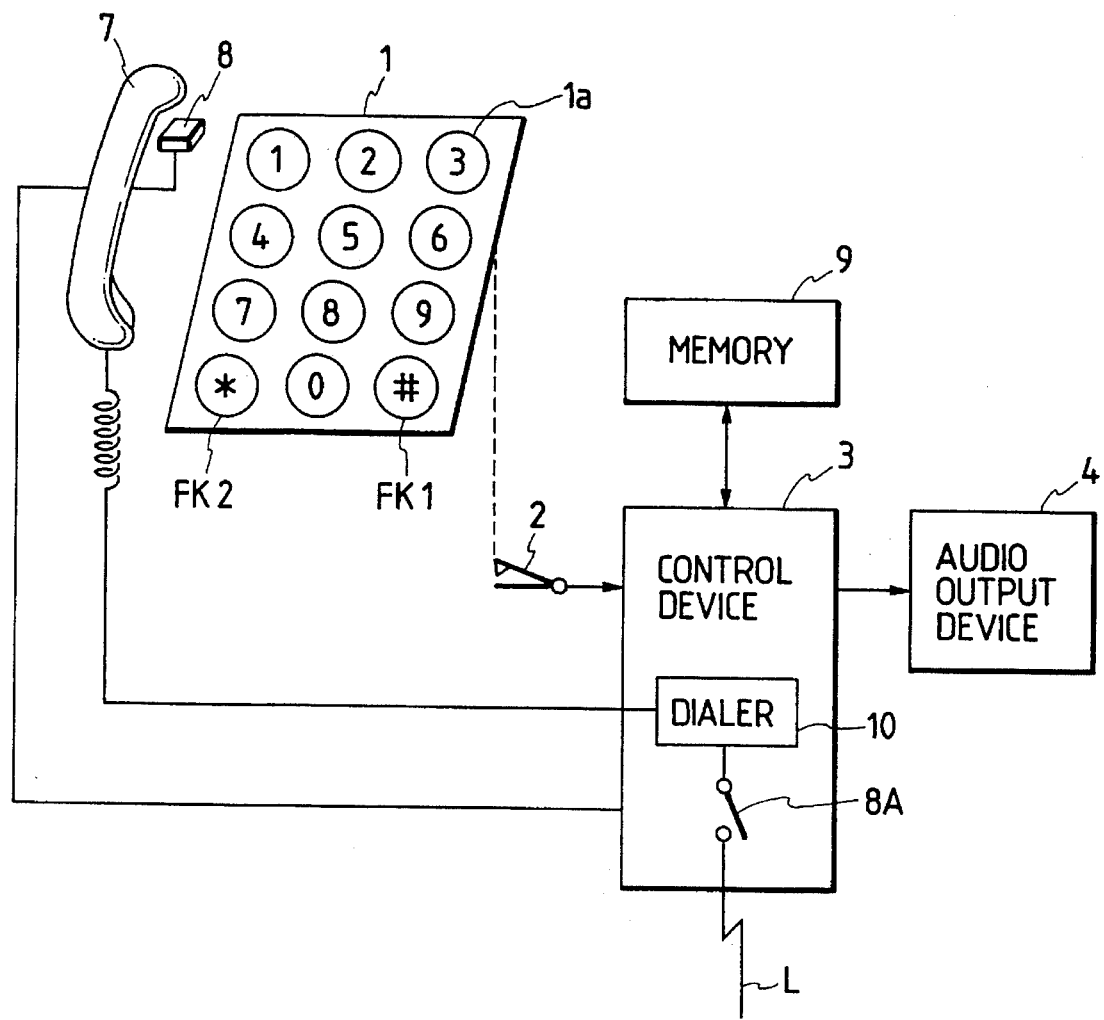
FIG. 1 is a schematic block diagram showing a communication terminal apparatus according to the first embodiment.

FIG. 1 is a schematic block diagram showing a part of a communication terminal apparatus according to the first embodiment of the invention. Reference numeral 1 denotes a key to input a telephone number (transmission number). The key 1 comprises a key top 1a and a key switch 2 which is turned on/off by a depressing operation of the key top 1a. The key switch 2 is made correspond to the key top 1a of the ten-key 1 to which each number of 0 to 9 has been allocated and the key top 1a of the two function keys $FK_1$ and $FK_2$ in a one-to-one corresponding manner. However, only one key switch 2 is shown in FIG. 1. The key switch 2 is a key switch at the first stage.

Reference numeral 3 denotes a control device to control the whole communication terminal apparatus. Particularly, the control device 3 detects the on/off state of each key switch 2 and produces the number code allocated to the key 1 which was turned on. The number code is stored into a memory 9. The control device 3 generates an audio sound such as "ichi (means a numerical value 1)", "ni (means a numerical value 2)", ... indicative of the key which was turned on from an audio output device 4. The control device 3 performs a control to transmit through a line L the dial signal corresponding to the key which was turned on or the like.

Reference numeral 7 denotes a handset; 8 a hook; 8A a hook switch which is interlocked with the hook 8; and 10 a dialer.

According to the first embodiment, when the telephone number is input by the key 1, the control device 3 stores all of the digits of the input telephone number into the memory 9. When the function key $FK_1$ is depressed, all of the digits of the transmission number stored in the memory 9 are read out and are generated in a lump by the audio output device 4 including a speaker or the like as an audio sound such as "zero, san, san, yon, san, ni, zero, zero, zero, ichi (in English, zero, three, three, four, three, two, zero, zero, zero, one (0334320001))". When the function key $FK_2$ is depressed, all of the digits of the transmission number stored in the memory 9 are read out and transmitted to the line L.

Since the telephone number which regards the input and has been stored in the memory 9 is generated as an audio sound by the audio output device 4 as mentioned above, even the visually handicapped person can confirm by an auditory sense whether a desired telephone number has correctly been input or not. Since all of the digits of the input telephone number are generated in a lump as an audio sound, a situation such that the visually handicapped person cannot know the number of digit of the number that is at present being generated is prevented, and the telephone number can be easily confirmed.

If the telephone number was erroneously input as a result of the confirmation by the audio sound, so long as the depression of the function key $FK_2$ to be performed next is not executed, the telephone number which was erroneously input is not sent to the line L, so that a wrong telephone call can be prevented.

When the telephone number is erroneously input, it is sufficient that the handset 7 is on-hooked and the hook 8 is turned on and the correct telephone number is again input by the key 1. When the visually handicapped person confirms by an audio sound that the telephone number was again input and was correctly input and subsequently depresses the function key $FK_2$, the control device 3 read out all of the digits of the telephone number stored in the memory 9 and transmits to the line L.

Figure 2:
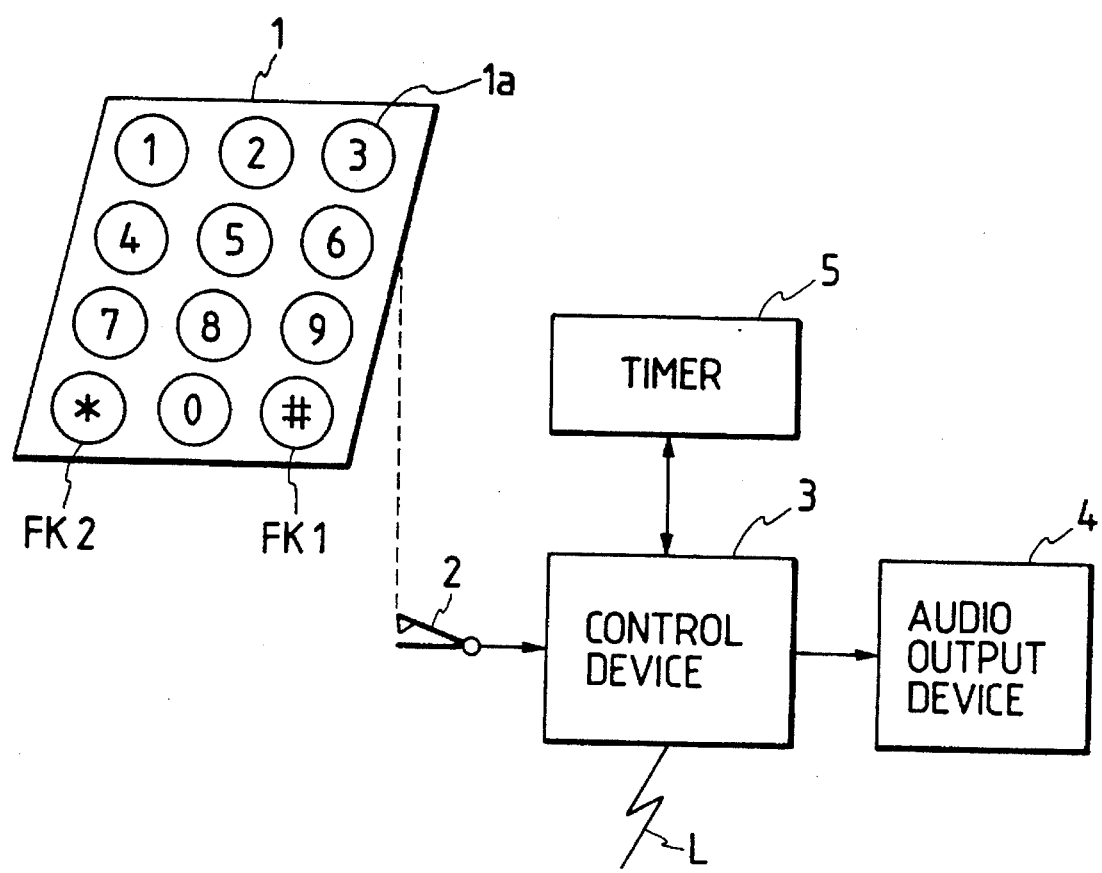
FIG. 2 is a schematic block diagram showing a communication terminal apparatus according to the second embodiment.

FIG. 2 is a schematic block diagram showing a part of a communication terminal apparatus according to the second embodiment. A timer 5 is provided in place of the memory 9 in FIG. 1. The timer 5 is provided to count the depression time of the key 1 and counts the depression time of the key in accordance with an instruction of the control device 3.

That is, in the second embodiment, when the key 1 is depressed, the control device 3 activates the timer 5 and monitors the depression continuation time of the key 1. When the key 1 is continuously depressed for a predetermined time $T_1$ or more, the control device 3 judges that such a depressing operation is the operation performed by the visually handicapped person, so that the control device 3 generates the number allocated to the depressed key 1 from the audio output device 4 including a speaker or the like and also continues the monitor of the depression continuation time of the key 1.

In the case where the key 1 is continuously depressed for a predetermined time $T_2$ ($T_1<T_2$) or more, the control device 3 transmits the number allocated to the numerical input key 1 regarding to such a depression to the line L after the elapse of a predetermined time $T_2$.

Therefore, when the operator knows the erroneous input by the audio sound, by stopping the depression of the key 1 before the elapse of the predetermined time $T_2$ from the start of the depression of the key 1, the telephone number which was erroneously input is not sent to the line L. Therefore, even the visually handicapped person doesn't make a wrong telephone call.

Moreover, in case of a visually handicapped person, generally, it takes a time to search the next key 1 and the depression time of the numerical input key 1 is long. Therefore, the wrong telephone call can be prevented even when the dialing apparatus is used by an ordinary use feeling of the visually handicapped person without strongly being aware of the generation of the audio sound.

On the other hand, when the key 1 is released and is returned to the original position before the elapse of the predetermined time $T_1$, the control device 3 judges that the inputting operation is the operation performed by the person with a normal eyesight, so that the number allocated to the key regarding the depression is immediately sent to the line L and no audio sound is generated.

In this case, since the person with a normal eyesight can confirm the telephone number by the eyesight, he generally inputs the dial number at a speed higher than that of the visually handicapped person. When the numerical input key is operated at a high speed in the ordinary manner, no audio sound is generated. Therefore, the person with a normal eyesight can use the dialing apparatus by a feeling of the ordinary telephone without the audio guiding function for the visually handicapped person without feeling a sense of disorder.

Figure 3:
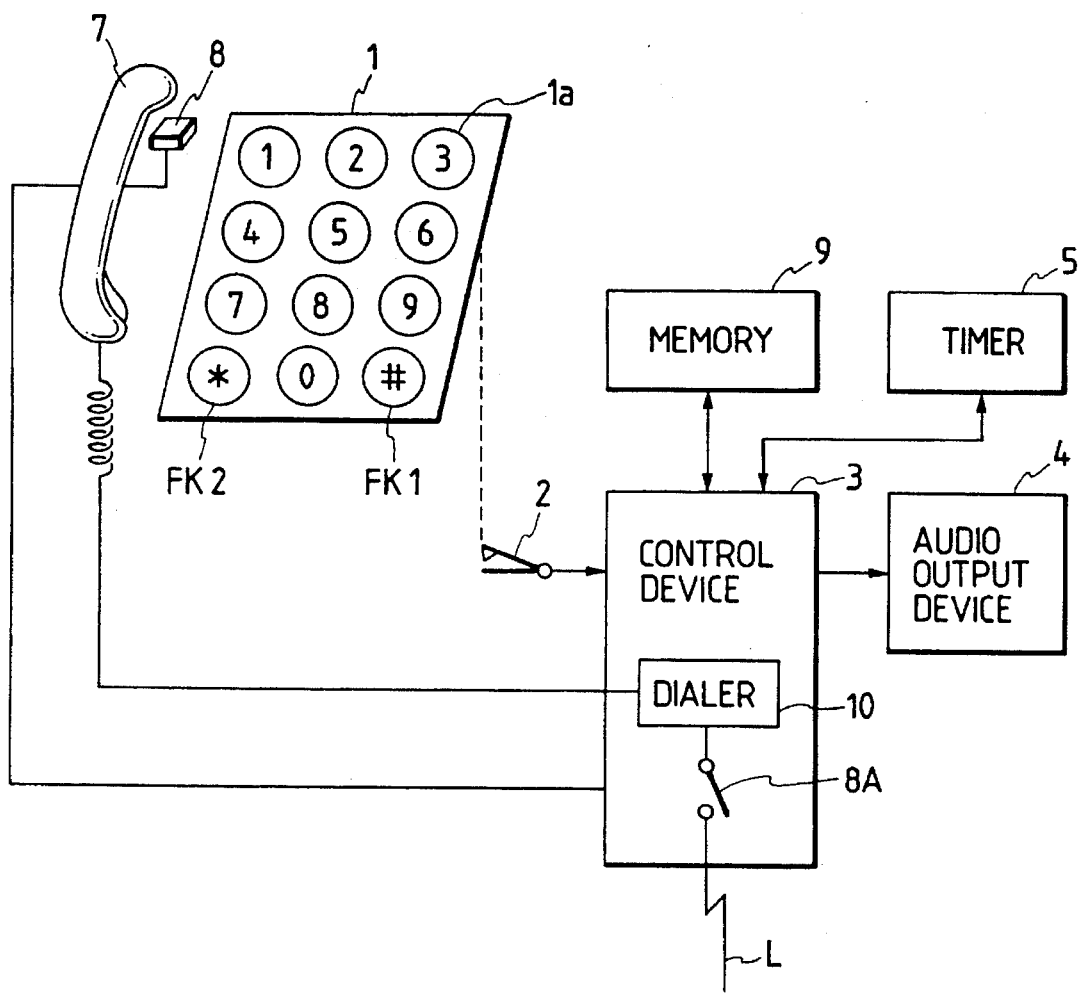
FIG. 3 is a schematic block diagram showing a communication terminal apparatus according to the third embodiment.

FIG. 3 is a schematic block diagram showing a part of a communication terminal apparatus (particularly, telephone) according to the third embodiment. The apparatus comprises the key 1, key switch 2, control device 3, audio output device 4, timer 5, memory 9, handset 7, hook 8 for the handset 7, and dialer 10. The hook 8 has the hook switch 8A which is turned on when the handset 7 is on-hooked. In the third embodiment, an audio sound to confirm the telephone number is generated in accordance with the on/off states of the hook 8 and key switch 2.

That is, in the third embodiment, when the handset 7 is lifted up and the hook 8 is on-hooked, the control device 3 activates the timer 5 and monitors the presence or absence of the key switch 2 which was turned on within a predetermined time in the ON state of the hook 8. When there is no key switch 2 which was turned on in the predetermined time, the control device 3 judges that the inputting operation is the operation by the visually handicapped person. Therefore, the control device 3 allows a predetermined audio guidance to be executed by the audio output device 4 including a speaker or the like in order to inform that the apparatus has the function such that the telephone number can be confirmed. Since such a guidance is used for the purpose to inform a message by an audio sound indicating that the apparatus has a function such that the telephone number can be confirmed, other audio informing methods can be used so long as it is a method of appealing to the auditory sense such as a buzzer or the like without limiting to the audio sound.

By the audio guidance, the visually handicapped person can also easily discriminate whether the communication terminal apparatus such as a telephone or the like which is used has the function to confirm the telephone number by the audio sound and can also easily recognize the position of the key 1 to be depressed. The apparatus of FIG. 3 includes the construction of the apparatus of FIG. 1 and executes the operation similar to that in the apparatus of FIG. 1.

Therefore, after the operator confirmed the position of the key 1 to be depressed, it is sufficient for the operator to operate in a manner similar to the case of the first embodiment mentioned above. In this instance, when the operator knows the erroneous input by listening to the telephone number generated from the audio output device 4, by stopping the depression of the function key $FK_2$, the telephone number regarding the erroneous input is not read out from the memory 9 and is not sent to the line L. Thus, there is an effect similar to that in the first embodiment such that the wrong telephone call is not made.

After the handset 7 was picked up, when the telephone number is immediately input, the control device 3 soon transmits the input number to the line L without generating an audio sound in a manner similar to the ordinary telephone. Therefore, the apparatus can be used without feeling a sense of disorder at all.

Figure 4:
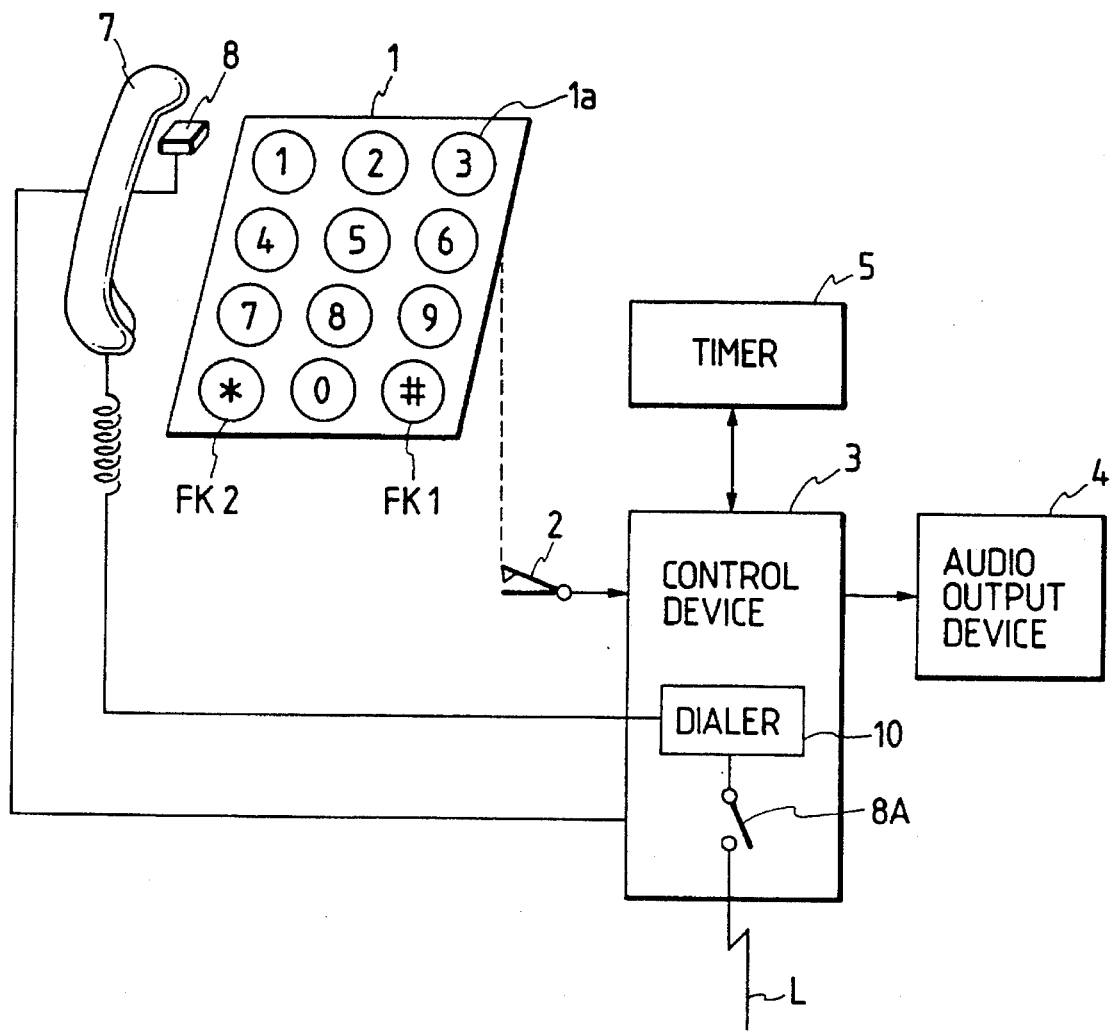
FIG. 4 is a schematic block diagram showing a communication terminal apparatus according to the fourth embodiment.

FIG. 4 is a schematic block diagram showing a part of a communication terminal apparatus (particularly, telephone) according to the fourth embodiment. The fourth embodiment has both of the functions of the second and third embodiments.

That is, in the fourth embodiment, when no telephone number is input by the key 1 within a predetermined time with the hook 8 held ON by lifting up the handset 7, the control device 3 executes a predetermined audio guidance by the audio output device 4 including a speaker or the like. Therefore, the visually handicapped person can easily discriminate the function of the communication terminal apparatus such as a telephone or the like and can also easily recognize the position of the key 1 to be depressed. The apparatus of FIG. 4 includes the construction of the apparatus of FIG. 2 and executes the operation similar to that of the apparatus of FIG. 3.

Therefore, after the operator confirmed the position of the key 1 to be depressed, it is sufficient that the visually handicapped person depresses the key 1 for a relatively long time and inputs all of the digits of the telephone number while generating and confirming the input telephone number one digit by one by an audio sound in a manner similar to the above second embodiment. When the operator listens to the audio sound and knows the erroneous input in the number inputting operation, by soon stopping the depression of the key 1, the number which was erroneously input is not transmitted to the line L and the wrong telephone call can be prevented.

In a manner similar to the third embodiment, after the handset 7 was picked up, when the telephone number is immediately input, the control device 3 soon transmits the input number to the line L without generating the audio sound in a manner similar to the ordinary telephone. Consequently, the operator can use the apparatus without feeling a sense of disorder.

Figure 5:
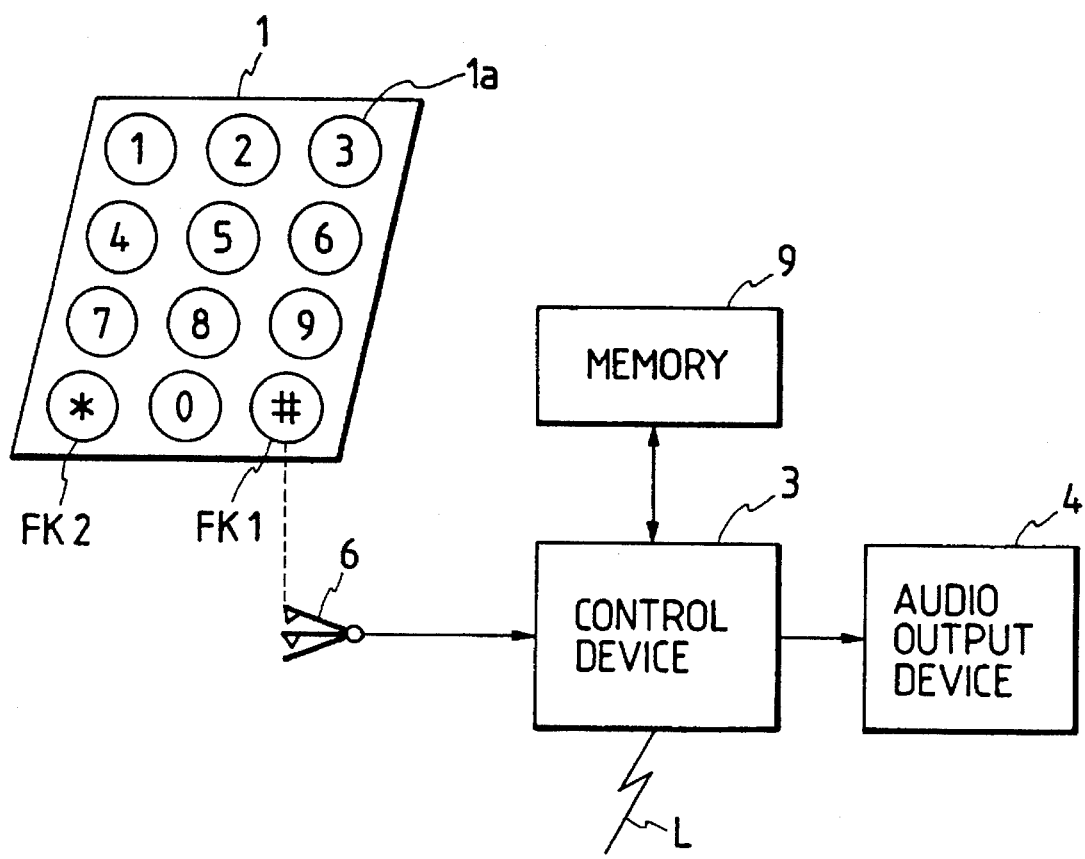
FIG. 5 is a schematic block diagram showing a communication terminal apparatus according to the fifth embodiment.

FIG. 5 is a schematic block diagram showing a part of a communication terminal apparatus (particularly, telephone) according to the fifth embodiment. A key switch of the function key $FK_1$ on which a mark "#" is written is different from the other keys and is a key switch 6 of double stage type instead of the key switch 2 of the single stage type. The switch at the first stage of the double stage type key switch 6 performs the function of the function key $FK_1$ in the first embodiment, while the switch of the second stage performs the function of the function key $FK_2$ in the first embodiment.

That is, in the fifth embodiment, in a manner similar to the first embodiment, when the telephone number is input by the key 1, the control device 3 stores all of the digits of the input telephone number into the memory 9.

When the operator slightly presses the key top 1a of the double stage type key switch 6 and the switch at the first stage is turned on, all of the digits of the telephone number stored in the memory 9 is generated by an audio sound by the audio output device 4 including a speaker or the like under control of the control device 3, so that even the visually handicapped person can confirm whether the desired telephone number was correctly input or not. As a result of the confirmation, if the telephone number was erroneously input, by deeply depressing the key top 1a of the double stage type key switch 6 and by stopping the turn-on of the switch at the second stage, the telephone number which was erroneously input is not transmitted to the line L, so that the wrong telephone call can be prevented.

As mentioned above, in the case where the key top 1a of the double stage type key switch 6 is not deeply depressed but the finger is released and all of the digits of a desired telephone number are again input and the key top 1a of the key switch 6 is slightly pressed and the telephone number regarding the re-inputting operation is generated as an audio sound and it is confirmed that the telephone number was correctly input, the key top 1a of the key switch 6 is deeply depressed. When such a deep depression is detected, the control device 3 transmits the correct telephone number regarding the re-inputting operation stored in the memory 9 to the line L.

Figure 6:
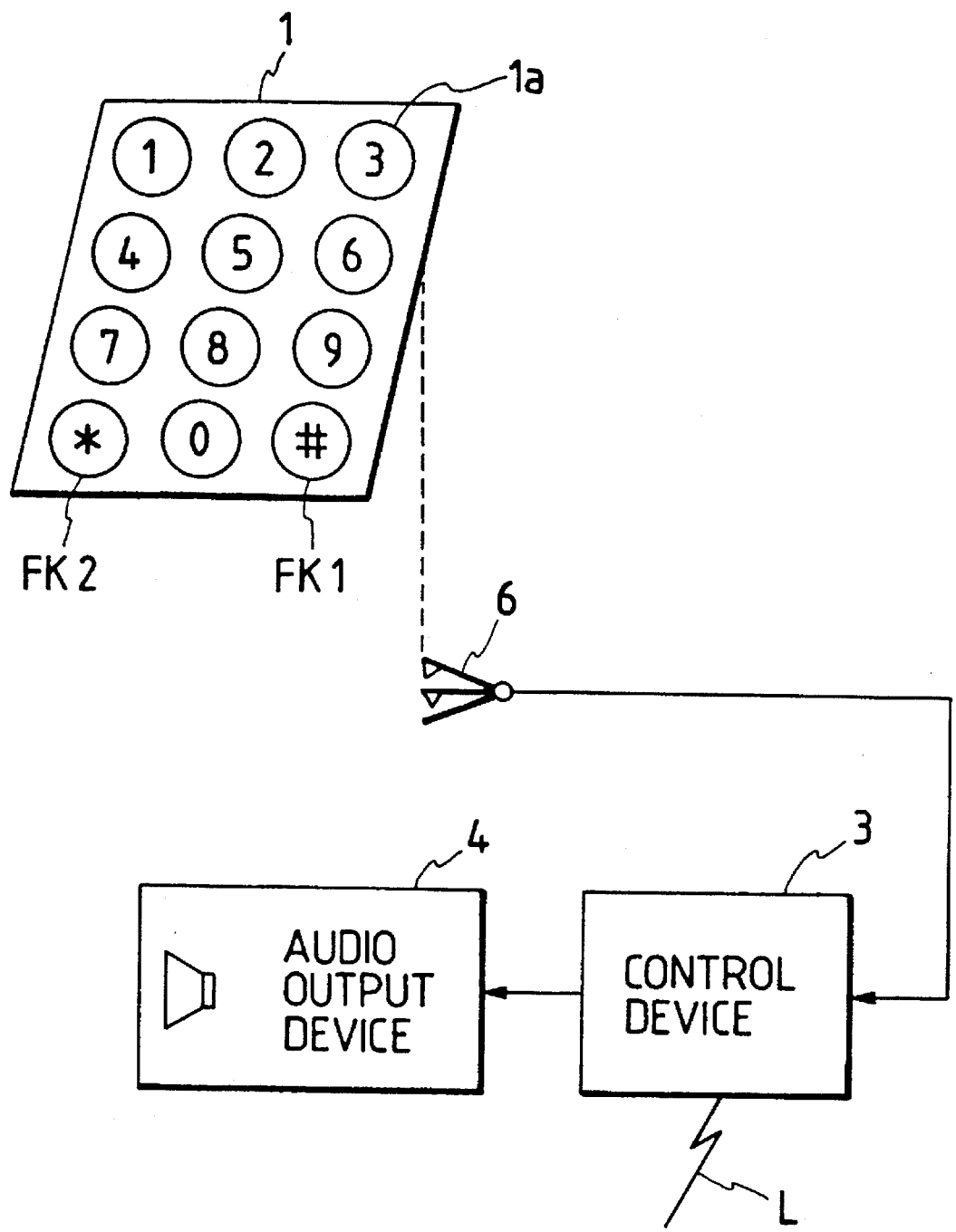
FIG. 6 is a schematic block diagram showing a communication terminal apparatus according to the sixth embodiment.

FIG. 6 is a schematic block diagram showing a part of a communication terminal apparatus (particularly, telephone) according to the sixth embodiment. In the sixth embodiment, with respect to at least the key switch of the key 1, all of the key switches are the double stage type key switches 6. On the basis of the on/off states of the key switches at the first and second stages of the double stage type key switch 6, the audio output of the telephone number and the transmission to the line L are controlled.

That is, in the sixth embodiment, when the key top 1a of the key 1 is slightly pressed and the key switch at the first stage is turned on, the number allocated to the depressed key 1 is output by an audio sound from the audio output device 4 including a speaker or the like under control of the control device 3.

As mentioned above, since the audio sound to inform the input number is generated at the stage when the key top 1a of one key 1 is slightly pressed, the erroneous input can be discriminated before completion of the inputting operation of all of the digits of the telephone number and there is no need to vainly input the telephone number. In this case, when the operator knows the erroneous input, the key top is not deeply depressed. That is, when the key top is not deeply depressed, the switch at the second stage is not turned on and it is possible to avoid that the number allocated to the depressed key 1 is transmitted, so that the wrong telephone call can be prevented.

When it is confirmed that the key is slightly pressed and the telephone number was correctly input, the key is deeply depressed and the switch at the second stage is turned on. When such a deep depression is detected, the control device 3 transmits the dial signal corresponding to the number allocated to the depressed key 1 to the line L.

Figure 7:
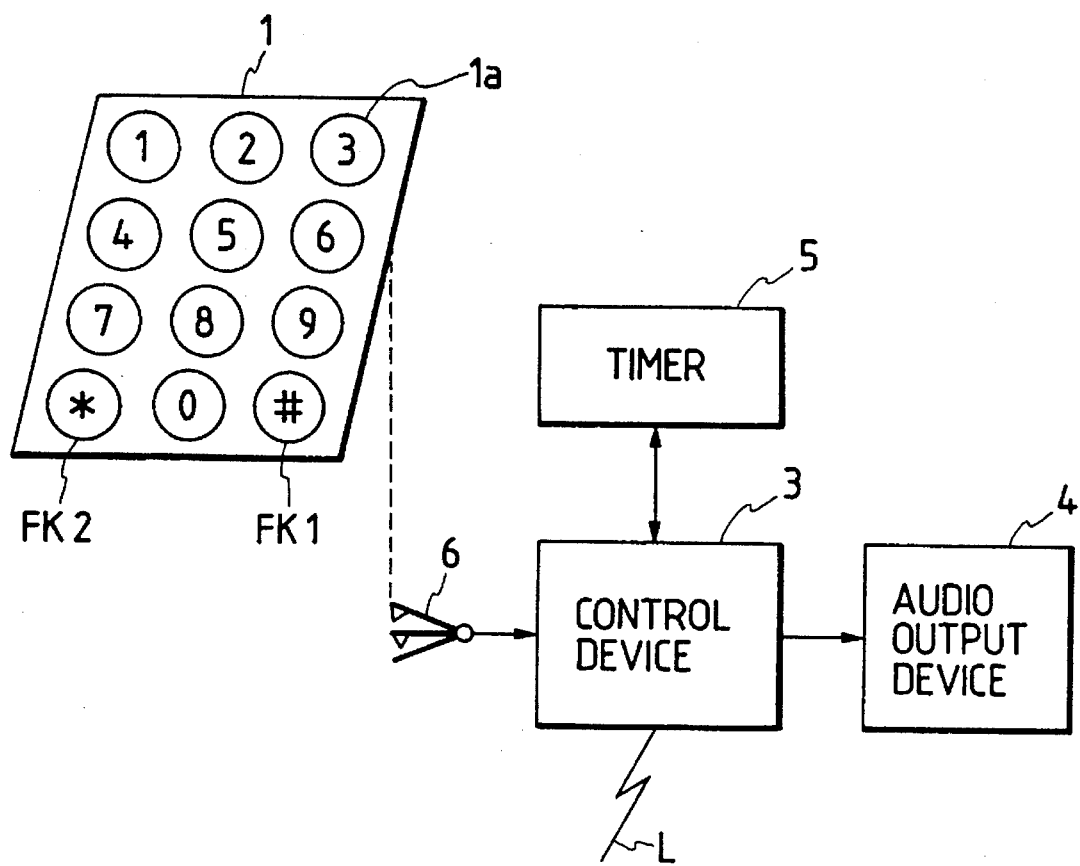
FIG. 7 is a schematic block diagram showing a communication terminal apparatus according to the seventh embodiment.

FIG. 7 is a schematic block diagram showing a part of a communication terminal apparatus (particularly, telephone) according to the seventh embodiment. With respect to at least the key switches of the key 1, all of them are the double stage type key switches 6. The timer 5 is further provided.

In the seventh embodiment, the key 1 is slightly pressed and the key switch at the first stage is turned on. After the elapse of a predetermined time, the key 1 is subsequently deeply depressed, thereby turning on the key switch at the second stage. Thus, the control device 3 generates the number allocated to the depressed numerical input key 1 from the audio output device 4 including a speaker or the like as an audio sound.

When the operator knows the erroneous input by the audio output, the key switch at the second stage is turned on. After that, when both of the key switches at the first and second stages are continuously turned on for a second predetermined time or more, the control device 3 stops the transmission of the number allocated to the depressed numerical input key 1 to the line L. Thus, the wrong telephone call can be prevented.

On the other hand, when the operator knows that the telephone number was correctly input by the audio output, the key switch at the second stage is turned on. After that, the finger is released within the second predetermined time and both of the key switches at the first and second stages are turned off. Thus, the control device 3 transmits the dial signal corresponding to the number allocated to the depressed numerical input key 1 to the line L.

Namely, in case of the erroneous input, by merely continuously depressing the key for a proper time without being aware of the continuous depression time after listening to the audio sound, the transmission of the input number to the line L is inhibited, so that the wrong telephone call can be certainly prevented. On the other hand, when the telephone number is correctly input, the input number can be promptly transmitted to the line L by an easy operation of a short time such that the finger is released immediately after the operator listened to the audio sound.

On the contrary, however, it is also possible to construct in a manner such that in case of the erroneous input, the finger is released in a second predetermined time and the transmission of the input number is inhibited and, in case of the correct input, the key is continuously depressed for the second predetermined time and the input number is transmitted.

When the key switch at the second stage is turned on before the elapse of the predetermined time after the key switch at the first stage of the key 1 was turned on by quickly deeply depressing the key 1, the control device 3 promptly transmits the number allocated to the depressed key 1 to the line L and doesn't generate an audio sound. Therefore, the person with a normal eyesight can use the apparatus without feeling a sense of disorder.

The invention is not limited to each of the above embodiments. For example, it is also possible to construct in a manner such that the audio output device such as a speaker or the like is not newly provided but the number (transmission number) for the line connection such as input telephone number, FAX number, or the like is generated as an audio sound from the existing handset.

Although the present invention has been described with respect to the preferred embodiments, the invention is not limited to the foregoing embodiments but many modifications and variations are possible within the spirit and scope of the appended claims of the invention.

What is claimed is:

1. A dialing apparatus for transmitting a dial signal to a communication line, comprising:

a handset;

a numerical key;

generating means for generating a first audible sound according to a depression of said numerical key; and transmitting means for transmitting a dial signal according to the depression of said numerical key to the communication line at a different timing from the generation of said first audible sound;

wherein said generating means generates, according to an off-hook of said handset by a user, a second audible sound for informing the user that said first audible sound is generated according to the depression of said numerical key.

2. An apparatus according to claim 1, further comprising:

memory means for storing data according to the depressed numerical key; and an instructing key for instructing said transmitting means to transmit the dial signal according to the data stored in said memory means.

3. An apparatus according to claim 2, further comprising:

a second instructing key for instructing said generating means to generate the audible sound according to the data stored in said memory means.

4. An apparatus according to claim 1, wherein said generating means generates the audible sound when said numerical key is depressed for a first time, and said transmitting means transmits the dial signal when the numerical key is depressed for a second time longer than said first time.

5. An apparatus according to claim 4, wherein said transmitting means doesn't transmit the dial signal in the case where said numerical key is depressed for a third time which is longer than said first time and is shorter than said second time.

6. An apparatus according to claim 1, wherein said generating means generates said second audible sound when said numerical key is not depressed within a predetermined time after said handset was off-hooked.

7. An apparatus according to claim 1, further comprising a plurality of numerical keys, and wherein said generating means generates an audible sound that is different in accordance with each of a plurality of numerical values of said numerical keys.

8. A dialing apparatus for transmitting a dial signal to a communication line, comprising:

a numerical key;

generating means for generating an audible sound according to a depression of said numerical key when the numerical key is continuously depressed for a first period longer than a first predetermined time; and transmitting means for transmitting a dial signal according to said depressed numerical key to the communication line when the numerical key is continuously depressed for a second period shorter than the first predetermined time or for a third period longer than a second predetermined time which is longer than the first predetermined time.

9. A dialing apparatus for transmitting a dial signal to a communication line, comprising:

a numerical key which is constructed by a double stage type switch;

generating means for generating an audible sound according to the depressed numerical key when the switch at the first stage of said numerical key is turned on; and transmitting means for transmitting the dial signal according to the depressed numerical key to the communication line when the switch at the second stage of the numerical key is turned on for a first period shorter than a predetermined time, a transmission of the dial signal being inhibited when the switch at the second stage is turned on for a second period longer than the predetermined time.

10. A dialing method comprising the steps of:

generating an audio sound according to a depression of a dial key;

transmitting a dial signal according to the depressed dial key in a case where the dial key is depressed for a first period shorter than a predetermined time; and inhibiting a transmission of the dial signal in a case where the dial key is depressed for a second period longer than the predetermined time.

11. A method according to claim 10, wherein the audio sound is generated when a first stage of the dial key of a double stage type is turned on.

12. A method according to claim 10, wherein the dial signal is transmitted when a second stage of the dial key of a double stage type is turned on for the first period, and the transmission of the dial signal is inhibited when the second stage of the dial key is turned on for the second period.

13. A method according to claim 10, wherein a depression of a numerical key is detected as the depression of the dial key.

14. A dialing method comprising:

transmitting a dial signal according to a depressed dial key when the dial key is continuously depressed for a first period shorter than a first predetermined time;

generating an audio sound according to the depressed dial key when the dial key is continuously depressed for a second period longer than the first predetermined time; and determining whether to transmit the dial signal or not based on whether the dial key is continuously depressed for a third period longer than a second predetermined time which is longer than the first predetermined time.

15. A method according to claim 14, wherein the dial signal is transmitted when the dial key is continuously depressed for the third period.

16. A method according to claim 14, wherein a depression of a numerical key is detected as the depression of the dial key.

17. A dialing method comprising the steps of:

generating a first audio sound according to an operated dial key;

transmitting a dial signal according to the operated dial key; and generating, according to an off-hook of a handset by a user, a second audio for informing the user that the first audio sound is generated according to the operated dial key.

18. A method according to claim 17, wherein the second audio sound is generated when the dial key is not operated in a predetermined period after the off-hook of the handset.

19. A method according to claim 17, wherein dial data is stored in a memory based on an operation of the dial key, and the first audio sound is generated based on the dial data stored in the memory according to an operation of a first function key.

20. A method according to claim 19, wherein the dial signal is transmitted according to an operation of a second function key.

21. A method according to claim 17, wherein the audio sound is generated according to an operation of the dial key, and whether the dial signal should be transmitted or not is determined based on whether the dial key is continuously depressed or not for a predetermined period after the audio sound is generated.

22. A method according to claim 21, wherein the dial signal is transmitted in a case where the dial key is continuously depressed for a period shorter than a predetermined threshold.

23. A method according to claim 17, wherein an operation of a numerical key is detected as an operation of the dial key.

* * * * *